United States Patent
Gagner et al.

(10) Patent No.: US 7,610,462 B2
(45) Date of Patent: Oct. 27, 2009

(54) GAMING MACHINE WITH SECURE FAULT-TOLERANT MEMORY

(75) Inventors: Mark B. Gagner, West Chicago, IL (US); Craig J. Sylla, Round Lake, IL (US); Nevin J. Liber, Libertyville, IL (US); Paul Radek, Naperville, IL (US); Stephen A. Canterbury, Antioch, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

(21) Appl. No.: 11/575,358

(22) PCT Filed: Sep. 16, 2005

(86) PCT No.: PCT/US2005/033035
§ 371 (c)(1),
(2), (4) Date: Aug. 20, 2007

(87) PCT Pub. No.: WO2006/033992
PCT Pub. Date: Mar. 30, 2006

(65) Prior Publication Data
US 2008/0096671 A1    Apr. 24, 2008

Related U.S. Application Data

(60) Provisional application No. 60/610,267, filed on Sep. 16, 2004.

(51) Int. Cl.
*G06F 12/00* (2006.01)
(52) U.S. Cl. .................. 711/162; 711/103; 463/43
(58) Field of Classification Search .................. None
See application file for complete search history.

(56) References Cited

U.S. PATENT DOCUMENTS
2003/0069074 A1    4/2003  Jackson

OTHER PUBLICATIONS

"International Search Report for Application No. PCT/US2005/033035, date mailed Mar. 15, 2006", 4 pgs.
"Written Opinion of the International Searching Authority for Application No. PCT/US2005/033035, date mailed Mar. 15, 2006", 4 pgs.

*Primary Examiner*—Kevin Verbrugge
(74) *Attorney, Agent, or Firm*—Schwegman, Lundberg & Woessner, P.A.

(57) ABSTRACT

A gaming machine includes two persistent random access memory sections. Critical data written to one memory section is copied to the other. Systems and methods for managing the two memory sections may include a transaction engine executable on a gaming machine processor. Alternatively, the transaction engine may execute or on a memory controller implemented as an Application Specific Integrated Circuit, a separate processor, or programmable logic. A transaction state may be used to determine which of the copies in the two memory sections is valid.

24 Claims, 12 Drawing Sheets

GAMING MACHINE WITH SECURE FAULT-TOLERANT MEMORY

RELATED APPLICATION

This application is a U.S. National Stage Filing under 35 U.S.C. 371 from International Patent Application Ser. No. PCT/US2005/033035, filed 16 Sep. 2005, and published on Mar. 30, 2006 as WO 2006/033992 A2 and republished on Mar. 30, 2006 as WO 2006/033992 A3, which claims the priority benefit of U.S. Provisional Application Ser. No. 60/610,267, filed Sep. 16, 2004, the contents of which are incorporated herein by reference.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

The inventive subject matter relates generally to gaming machines and, more specifically, to a gaming machine with secure fault-tolerant random access memory (RAM).

BACKGROUND

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Players also appreciate the reliability of a gaming machine, as do the casino operators. Shrewd operators consequently strive to employ the most entertaining, exciting, and reliable machines available because such machines attract frequent play and hence increase profitability to the operator.

Currently, microprocessor-based gaming machines, as well as most microprocessor-based devices use a direct access data storage mechanism commonly referred to in the industry as Random Access Memory (RAM). RAM is immediately accessible by the processor with no additional software required (as in the case of disk drives). The content of this memory is typically critical to the operation of the gaming machine and is continuously changing as it is read and written, as when game play occurs. One drawback of RAM is that it is power dependent and does not retain the current state of the computer's operation when power is removed.

In most critical computer applications, this information must be retained through a power cycle. Small batteries are used to maintain power to the RAM when the main power is removed. Oftentimes, gaming regulations require that this battery back-up configuration be deployed to retain game state during a power cycle. The inherent risk in deploying this type of technology rests firmly with the reliability of the batteries used. Failure due to flaws or simple power depletion will render this back-up feature useless.

In current RAM applications, access and verification is also limited. Since most memory applications only store one copy of the data, special access and addressing are not required. Programs simply read and write to the same address map and always use the same address for a given piece of information, especially critical variables.

A variety of weaknesses are evident in the methodology and execution of RAM access and use. One weakness is that there is only one copy (unless a second copy is maintained separately) stored and verification is performed only if the user of the data initiates it. Another weakness is that if power to the gaming machine is lost during an update of a critical value, incorrect or incomplete information may be written to memory and any backup copies may not constitute current values.

SUMMARY

Systems and methods provide secure, fault-tolerant random access memory in a gaming machine. In one aspect, a system comprises a persistent random access memory (PRAM) controller, two sections of nonvolatile random access memory (NVRAM), and synchronized dynamic random access memory (SDRAM). A transaction engine is used to process transactions to/from the system memory. In some embodiments, the transaction engine executes on a gaming machine processor. Additionally, the transaction engine may execute on the persistent RAM controller. The PRAM controller may be implemented as an Application Specific Integrated Circuit (ASIC), a separate processor, or programmable logic. Copies of the current data are stored on two NVRAM sections controlled by the persistent RAM controller chip. A transaction state indicator may be used to determine which of the copies in the two memory sections is valid.

The present invention describes systems, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

The foregoing and other advantages of the invention will become apparent upon reading the following detailed description and upon reference to the drawings in which.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The following detailed description is, therefore, not to be taken in a limiting sense, and the scope of the present invention is defined only by the appended claims.

Figure 1:
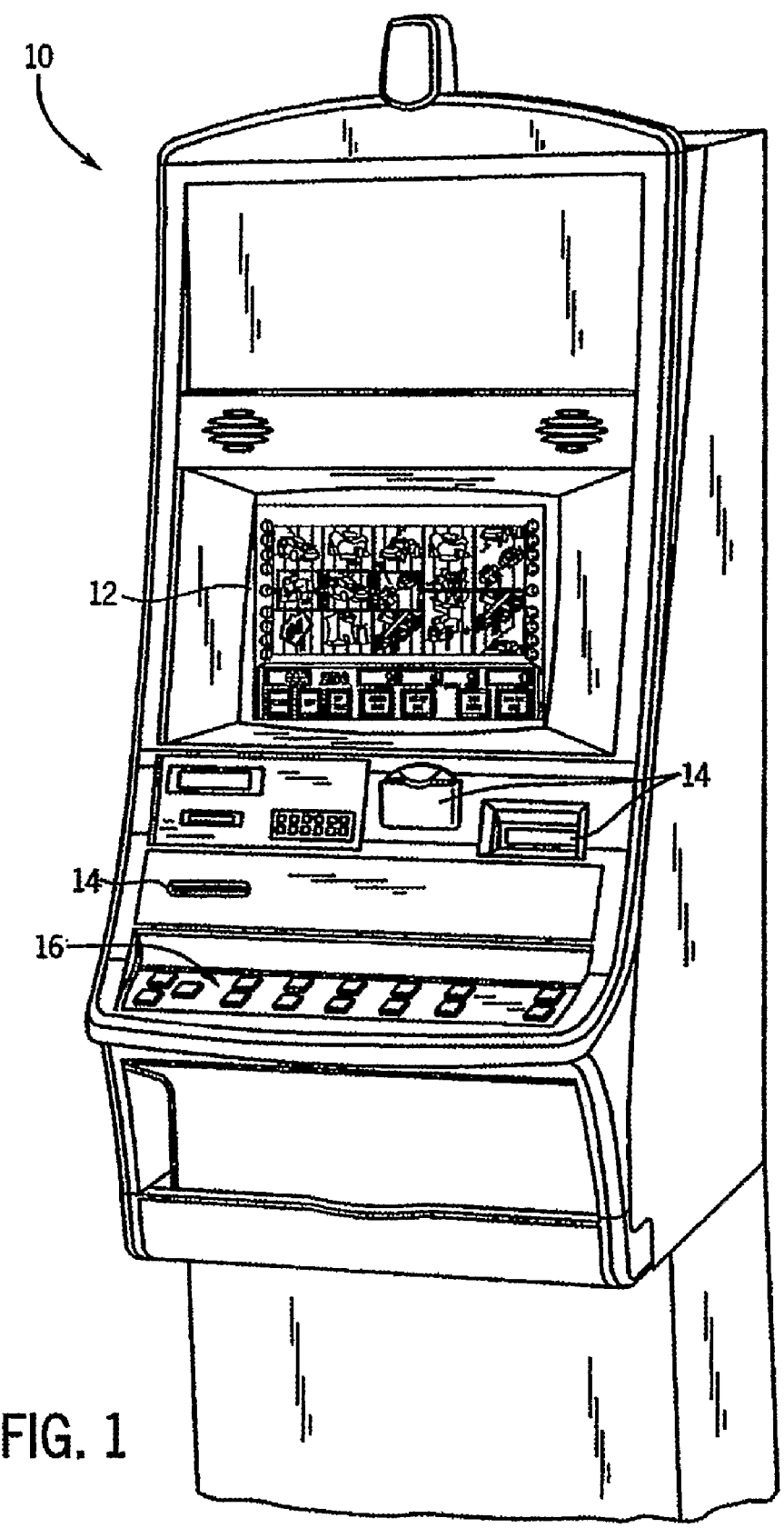
FIG. 1 is a perspective view of a gaming machine with secure fault-tolerant memory in accordance with the present invention.

FIG. 1 depicts a gaming machine 10 operable to conduct a slot-based wagering game. In operation, the gaming machine receives a wager from a player to purchase a "play" of the game. In a "play" of the game, the gaming machine generates at least one random event and provides an award to the player for a winning outcome of the random event. The random event may be internally or remotely determined using a random number generator (RNG) or pooling schema. To portray the random event and outcome to the player, the gaming machine includes a primary display 12. If the wagering game is a reel slot game, for example, the primary display 12 includes a plurality of symbol-bearing reels that are rotated and stopped to place symbols on the reels in visual association with the pay line.

The primary display 12 may be implemented with a CRT, LCD, plasma, mechanical reels (in the case of a reel slot game), or other type of display known in the art. The primary display 12, especially if implemented in video, may be overlaid with a touch screen to facilitate interaction with the player. In the illustrated embodiment, the gaming machine 10 is an "upright" version in which the primary display 12 is oriented vertically relative to the player. Alternatively, the gaming machine may be a "slant-top" version in which the primary display 12 is slanted at about a thirty-degree angle toward the player of the gaming machine 10.

The gaming machine 10 includes a plurality of possible credit receiving mechanisms 14 for receiving credits to be used for placing wagers in the game. The credit receiving mechanisms 14 may, for example, include a coin acceptor, a bill acceptor, a ticket reader, and a card reader. The bill acceptor and the ticket reader may be combined into a single unit. The card reader may, for example, accept magnetic cards and smart (chip) cards coded with money or designating an account containing money.

In some embodiments, the gaming machine 10 includes a user interface comprising a plurality of push-buttons 16, the above-noted touch screen, and other possible devices. The plurality of push-buttons 16 may, for example, include one or more "bet" buttons for wagering, a "play" button for commencing play, a "collect" button for cashing out, a "help" button for viewing a help screen, a "pay table" button for viewing the pay table(s), and a "call attendant" button for calling an attendant. Additional game specific buttons may be provided to facilitate play of the specific game executed on the machine. The touch screen may define touch keys for implementing many of the same functions as the push-buttons. Other possible user interface devices include a keyboard and a pointing device such as a mouse or trackball.

A processor controls operation of the gaming machine 10. In response to receiving a wager and a command to initiate play, the processor randomly selects a game outcome from a plurality of possible outcomes and causes the display 12 to depict indicia representative of the selected game outcome. In the case of slots for example mechanical or simulated slot reels are rotated and stopped to place symbols on the reels in visual association with one or more pay lines. If the selected outcome is one of the winning outcomes defined by a pay table, the CPU awards the player with a number of credits associated with the winning outcome.

Figure 2:
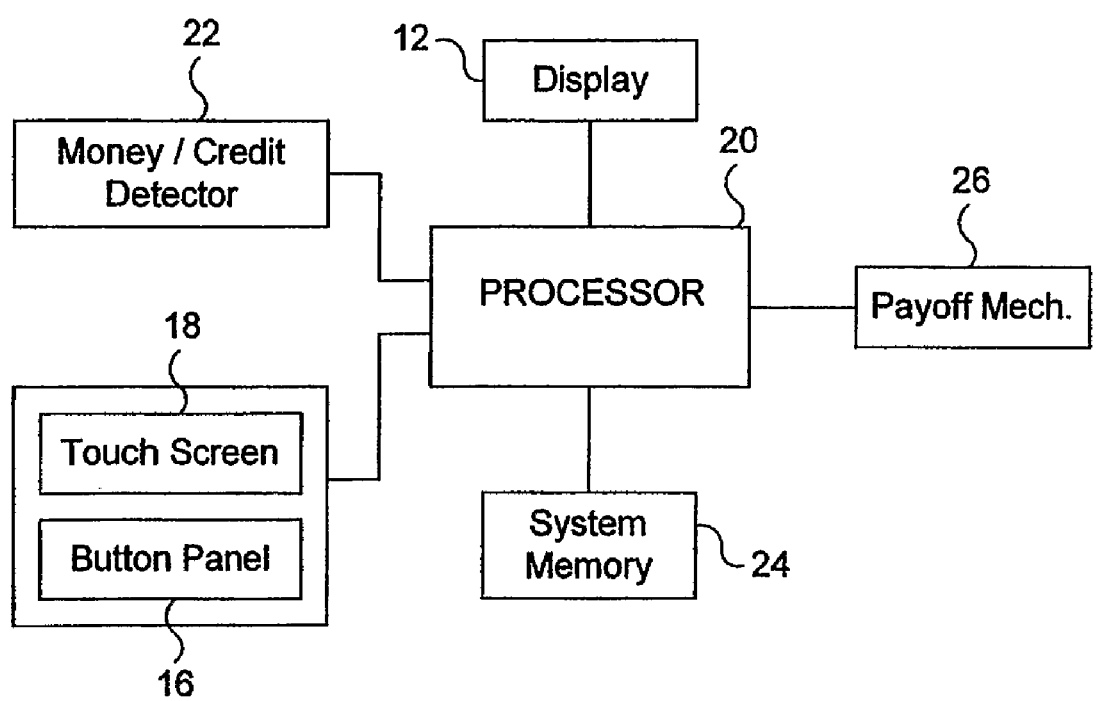
FIG. 2 is a block diagram of a control system suitable for operating the gaming machine.

FIG. 2 is a block diagram of a control system suitable for operating the gaming machine 10. Money/credit detector 22 signals a processor 20 when a player has inserted money, tickets, tokens, cards or other mechanism for obtaining credits for plays on the gaming machine through credit mechanisms 14. Using a button panel 16 and/or a touch screen 18, the player may select any variables associated with the wagering game and place his/her wager to purchase a play of the game. In a play of the game, the processor 20 generates at least one random event using a random number generator (RNG) and provides an award to the player for a winning outcome of the random event. Alternatively, the random event may be generated by a remote computer using an RNG or pooling schema and then transmitted to the gaming machine. The processor 20 operates the display 12 to represent the random event(s) and outcome(s) in a visual form that can be understood by the player. In addition to the processor 20, the control system may include one or more additional slave control units for operating the display 12 and any secondary displays.

System memory 24 stores control software, operational instructions and data associated with the gaming machine. In one embodiment, the system memory 24 comprises a separate read-only memory (ROM) and battery-backed random-access memory (RAM). However, it will be appreciated that the system memory 24 may be implemented on any of several alternative types of memory structures or may be implemented on a single memory structure. A payoff mechanism 26 is operable in response to instructions from the processor 20 to award a payoff to the player. The payoff may, for example, be in the form of a number of credits. The number of credits is determined by one or more math tables stored in the system memory 24.

Figure 3A:
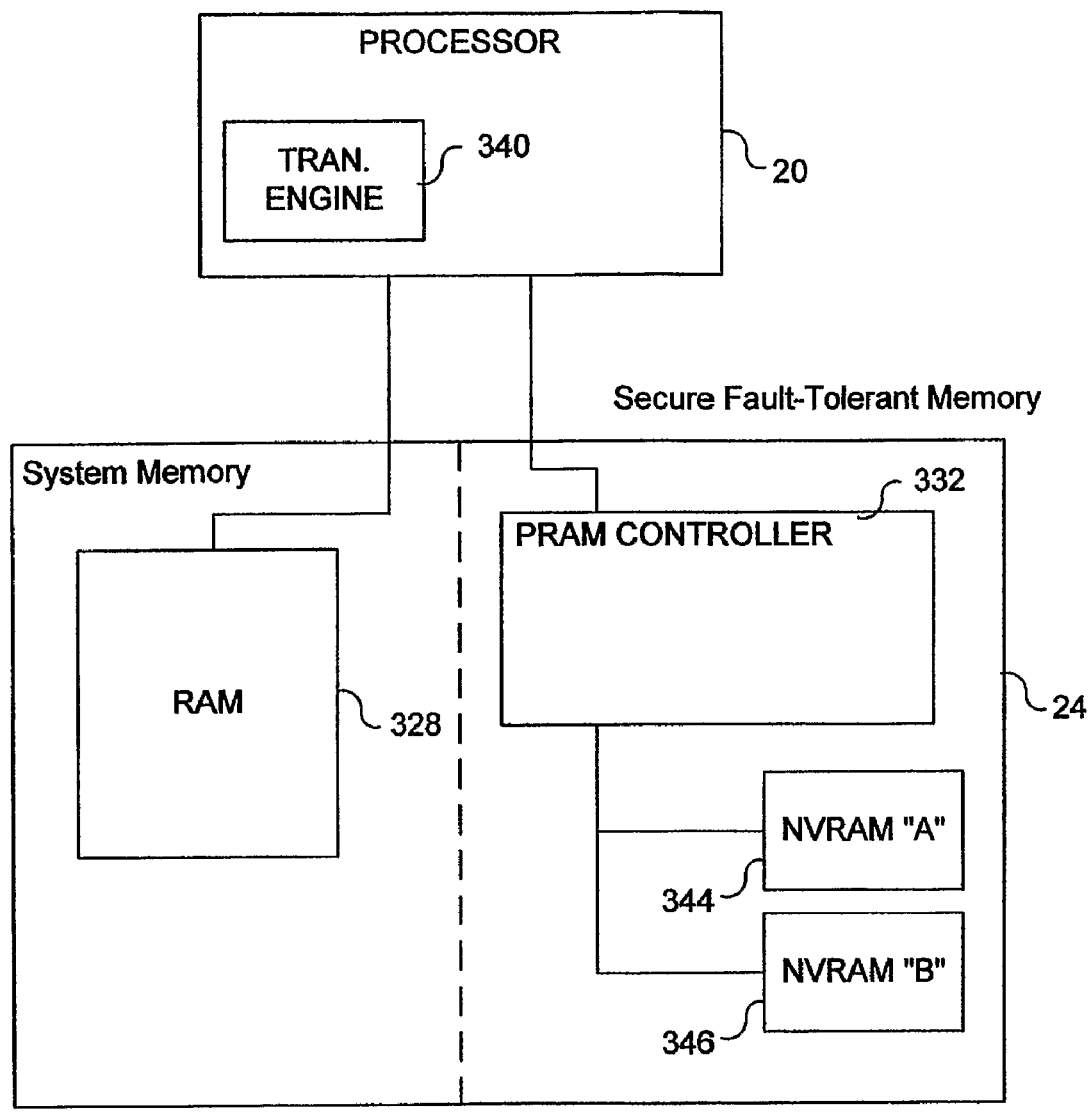
FIGS. 3A and 3B are block diagrams of system memory configurations within the control system according to various embodiments of the invention.

FIG. 3A is a block diagram providing further details regarding the interrelationship between the processor 20 and system memory 24 components in a gaming machine. In various embodiments, system memory 24 includes a general purpose RAM 328, a PRAM (Persistent Random Access Memory) controller 332, and at least two non-volatile random access memories (NVRAM) 344 and 346. PRAM controller 332 is communicably coupled to processor 20, and controls access to non-volatile memories 344 and 346. In some embodiments, PRAM controller 332 is an ASIC (Application Specific Integrated Circuit) designed to control access to memories 44 and 46. In alternative embodiments, PRAM controller 332 may be an ancillary processor or other programmable logic element.

In some embodiments, NVRAM 344 and 346 may comprise battery backed RAM, including battery backed SRAM (Static RAM). In alternative embodiments, NVRAM 344 and 346 may comprise MRAM (magnetoresistive or magnetic RAM). Generally speaking, MRAM is a non-volatile RAM memory technology that uses magnetic charges to store data instead of electric charges, such as those used in SRAM and DRAM technologies. In further alternative embodiments, NVRAM 44 and 46 may be FRAM (Ferroelectric RAM). MRAM and FRAM are desirable, because they do not require battery backup in order for the memory to retain data. It should be noted that MRAM or FRAM may also be used for general purpose memory 328.

In some embodiments, transaction engine 340 executes on processor 20. Transaction engine 340 operates to write data to NVRAM 344 and 346 and verify data using the techniques and methods described below so that critical data stored on NVRAM 344 and 346 may be recovered in the event of a power failure or other anomalous event occurring on gaming machine 10. Such critical data may include but is not limited to machine configuration data, credit amounts, wager amounts, game play history data or any other data that is desirable to be maintained across gaming machine reboots and/or power cycles. Critical data may also include data that must be reported to one or more of the various regulatory agencies that control gaming in a jurisdiction. Examples of critical data may include one or more of the following:

Number of winning outcomes
Payout for the machine
Wagering details (e.g. number of lines wagered, number coins wagered etc.)
Coin-in amounts and denominations Data written to NVRAM 344 and 346 is typically performed in the context of a transaction, where the transaction starts with a "begin transaction" command and ends with a "commit transaction" command. In embodiments where the transaction engine executes on processor 20, the begin transaction and commit transaction commands may be implemented as part of an API (Application Program Interface) executed by processor 20. In the embodiment described above, transaction processing and memory verification tasks share the processor with other tasks such as gaming applications.

Figure 3B:
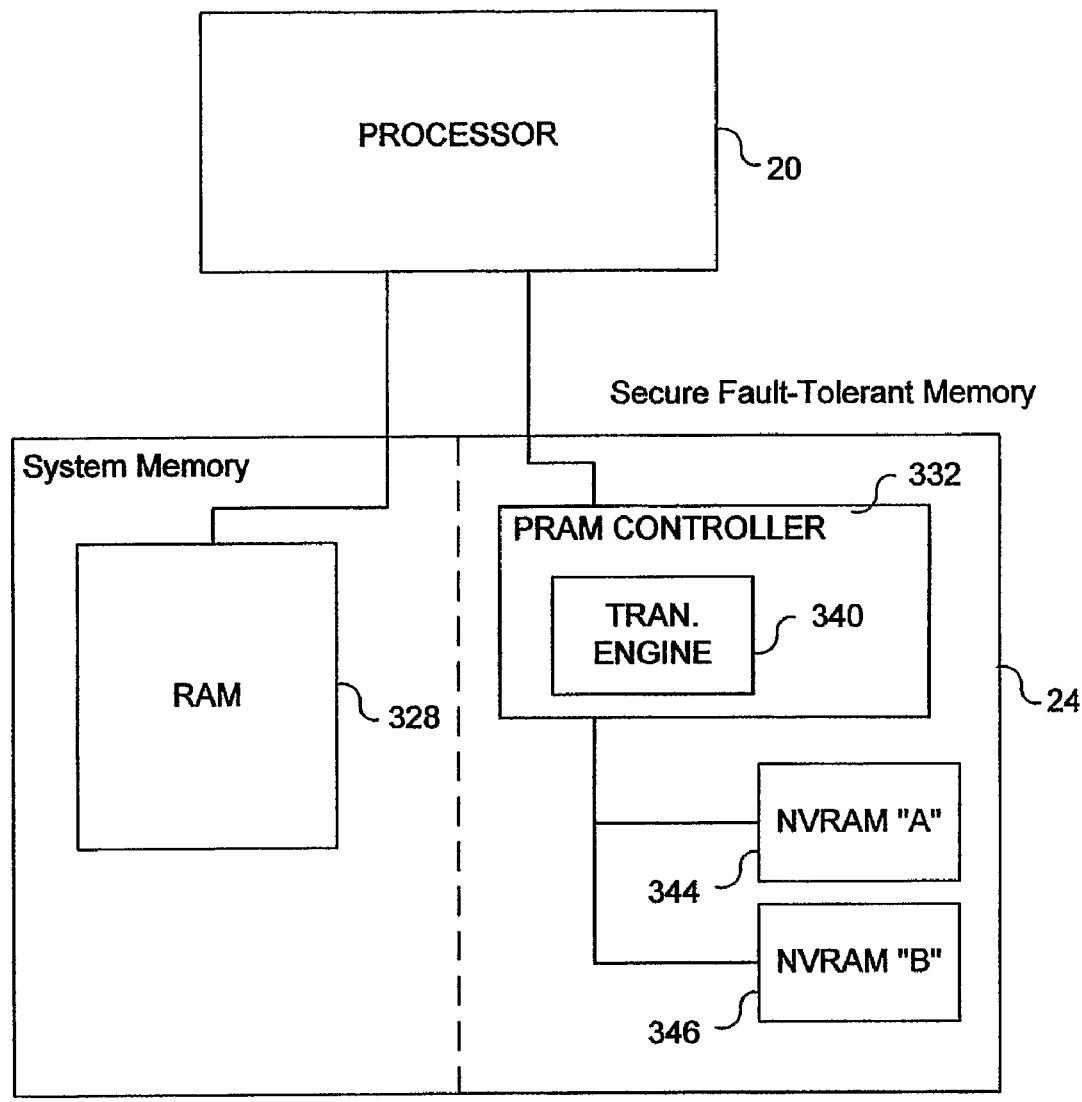

FIG. 3B illustrates alternative embodiments in which the transaction engine 340 executes on PRAM controller 332. The components illustrated in FIG. 3B are essentially the same as those described above with reference to FIG. 3A, however in the exemplary embodiment described below, the transaction engine operates on PRAM controller 332. Transaction processing and memory verification can be time consuming tasks that may need to be performed frequently. In this example, the PRAM controller 332 performs significant transaction processing instead of processor 20 thus increasing machine performance.

In the embodiments represented by FIG. 3B, data modifications may be handled as transactions although many transaction sequences may be limited to a single data block. In some embodiments, transactions do not span multiple threads of execution and an individual thread of execution does not have multiple concurrent transactions. The memory system may pre-assign a particular transaction space to each thread or it may assign an unused transaction space from a pool. A thread will have exclusive use of a particular transaction space for the duration of a transaction. In some embodiments, the PRAM controller 332 maintains a variable or register that corresponds to the overall transaction depth for each transaction space. These registers are used to determine when a transaction is actually complete and the affected data blocks may be written. At power-up, the transaction depth is reset to zero, which corresponds to a "locked" state.

The PRAM controller 332 of some embodiments provides a mechanism that allows the processor 20 to begin and commit transactions and query the current transaction depth, which facilitates debugging and diagnostics. Further details on the operations associated with transactions are provided below with reference to FIGS. 7-8.

Figure 4A:
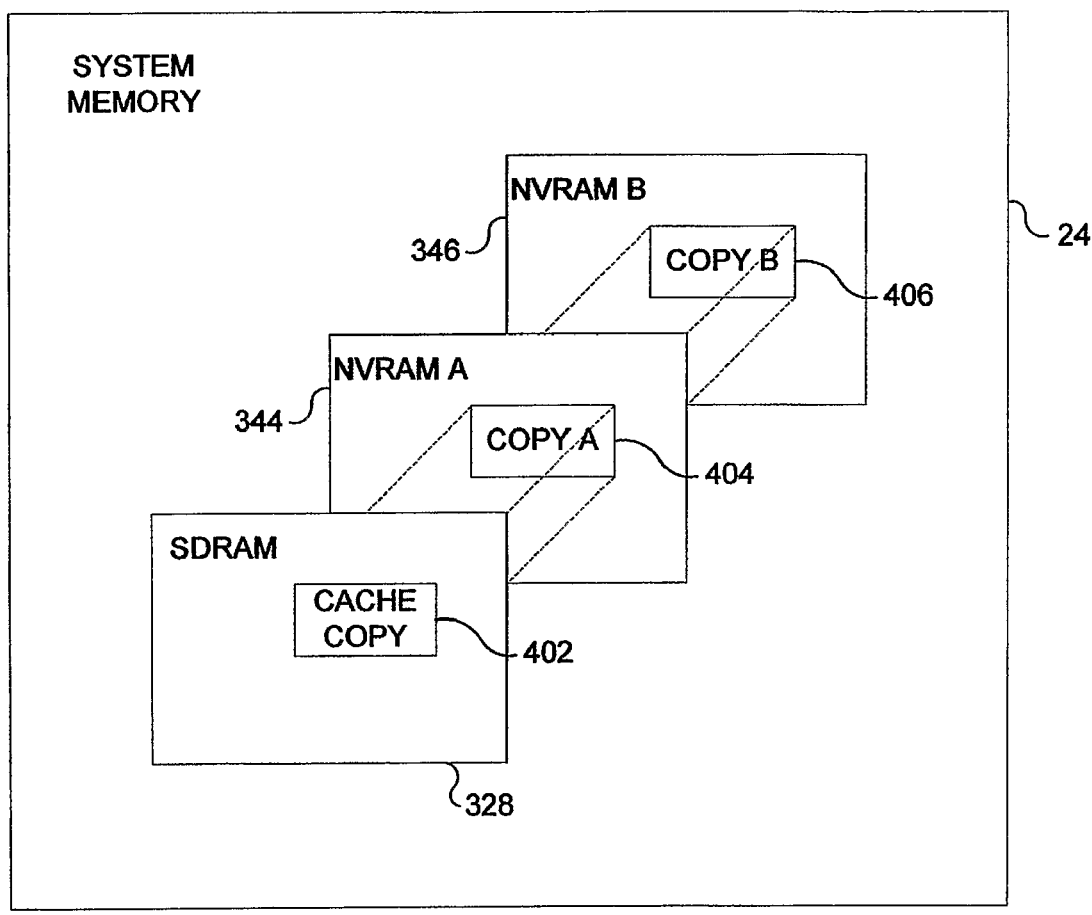
FIGS. 4A and 4B are visual representations of the configuration of memory spaces on non-volatile random access memory (NVRAM) according to embodiments of the invention.

FIG. 4A illustrates an exemplary memory organization used in some embodiments. In these embodiments, up to three copies of a data object may be maintained, a cache copy 402 in general purpose memory 328, a copy "A" in NVRAM A 344, and a copy "B" 406 in NVRAM B 346. Rather than allocate space indiscriminately within each memory 328, 344 and 346, each object is created within each store at the same relative offset. Therefore the system need keep only one offset value regardless of which store is being accessed. Thus cache copy 402, copy "A" 404 and copy "B" 406 of a data object are all maintained at the same offset in their respective memories 328, 344 and 346.

Figure 4B:
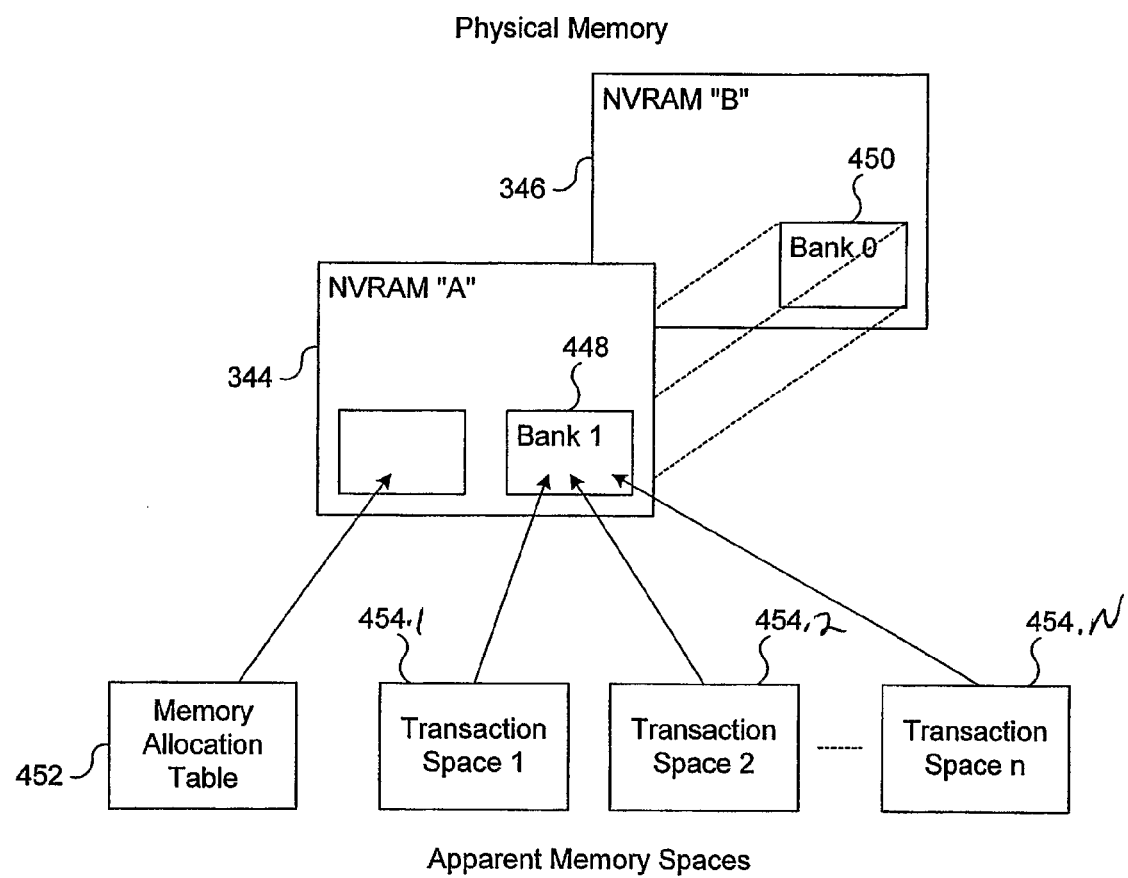

FIG. 4B illustrates an exemplary memory organization used in alternative embodiments. FIG. 4B provides a general representation of mapped "apparent" memory spaces on physical memory 24. In these embodiments, memory bank 448 and memory bank 450 occupy the same apparent address space and are not individually visible to processor 20. This allows processor to treat the secure fault-tolerant memory as if it were normal RAM. There are occasions when multiple transactions must be interleaved. In this embodiment, the PRAM controller 332 will "shadow" the actual physical memory to two or more virtual or apparent memory ranges. These are referred to as transaction spaces 454.

A memory allocation table 452 is also shadowed. In some embodiments, the memory allocation table 452 is normally locked and any attempts to read or write to this space while locked will cause the PRAM controller 332 to signal an exception.

When the processor 20 writes into a transaction space 454 on bank "1" 448, the PRAM controller 332 defers mirroring/backup to bank "0" 450 until the processor 20 signals that the transaction is complete. This embodiment is not limited to two apparent transaction spaces 454. Additional transaction spaces 454 may be mapped onto the physical memory to distinguish additional transactions or other types of operations. For example, a third transaction space could be created to represent memory that is non-volatile but not mirrored. This type of space might be used to store information that needs to be persisted but is not critical (such as error or debug logs).

Figure 5A:
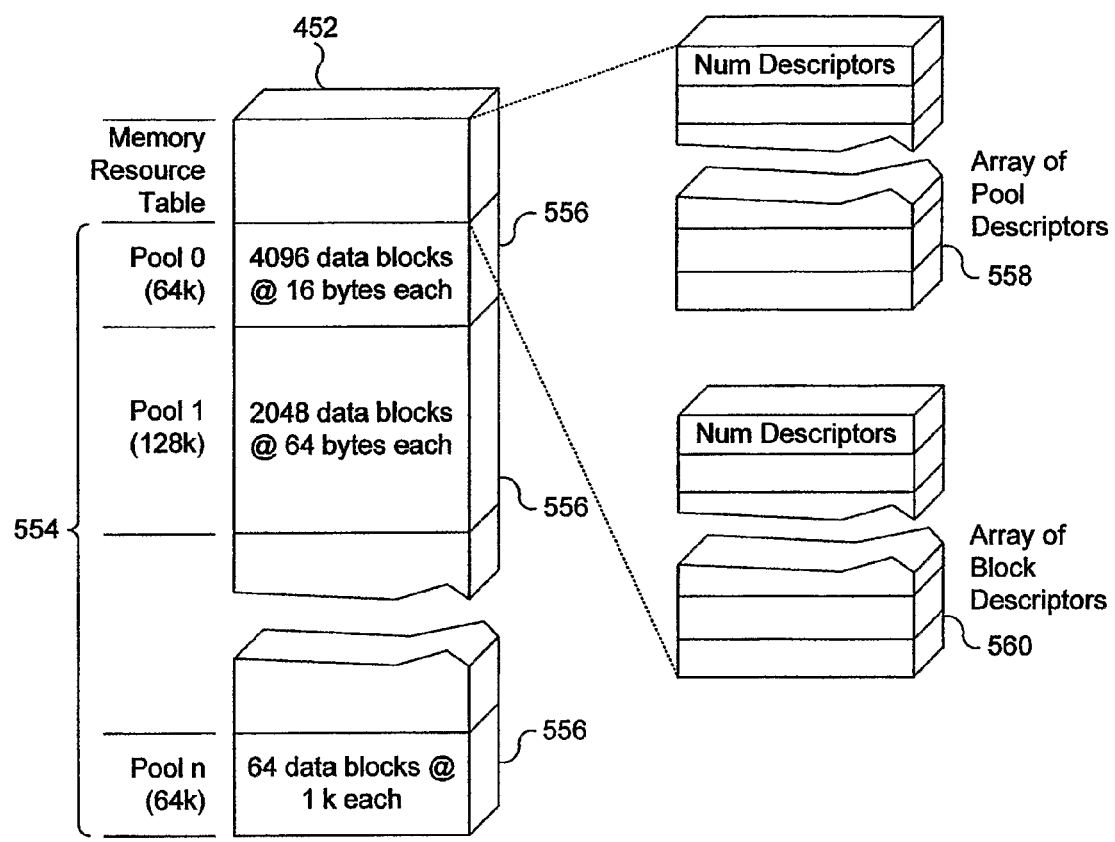
FIGS. 5A-5C are visual representations of data organizations according to various embodiments of the invention.

FIG. 5A provides further details on a memory organization for a persistent RAM according to embodiments of the invention. In some embodiments, the PRAM controller 332 treats the NVRAM as an array of data blocks. Each block may have an independent transaction state and CRC (cyclic redundancy check) value. As shown in FIG. 5A, data blocks 556 are arranged into memory pools 554. Each pool 554 consists of an array of data blocks 556. All data blocks 556 within a particular pool 554 are the same size. A typical system may have only one pool but multiple pools are possible as shown in FIG. 5A. The application code allocates memory in blocks of varying size. To make efficient use of the NVRAM, PRAM controller 332 will allow multiple memory pools 554 to be configured by the processor. Software executing on the processor may specify the number of data blocks 556 and the data block size for each pool 554.

In some embodiments, the PRAM controller 332 is responsible for persisting the memory configuration. For example, this may be done through the use of a memory resource table 452 located within a reserved portion of the NVRAM. Other schemes are possible. In this embodiment, the memory resource table 452 consists of an array of pool descriptors 558 and an array of data block descriptors 560. Pool descriptor 558 contains data enabling access to blocks within the pool. In some embodiments, this data includes the index to the first data block descriptor associated with the pool, the number of data blocks in the pool, the size of the data blocks in the pool, and the starting address of the pool in NVRAM. Data block descriptor 560 contains data describing data blocks. In some embodiments, this data includes a handle or identifier, a transaction ID and the CRC for the bank in which the data block resides.

The example shown in FIG. 5A provides various sizings for the different memory pools and structures and assumes a 512K byte NVRAM. Those of skill in the art will appreciate that alternative sizes are possible and within the scope of the invention.

Figure 5B:
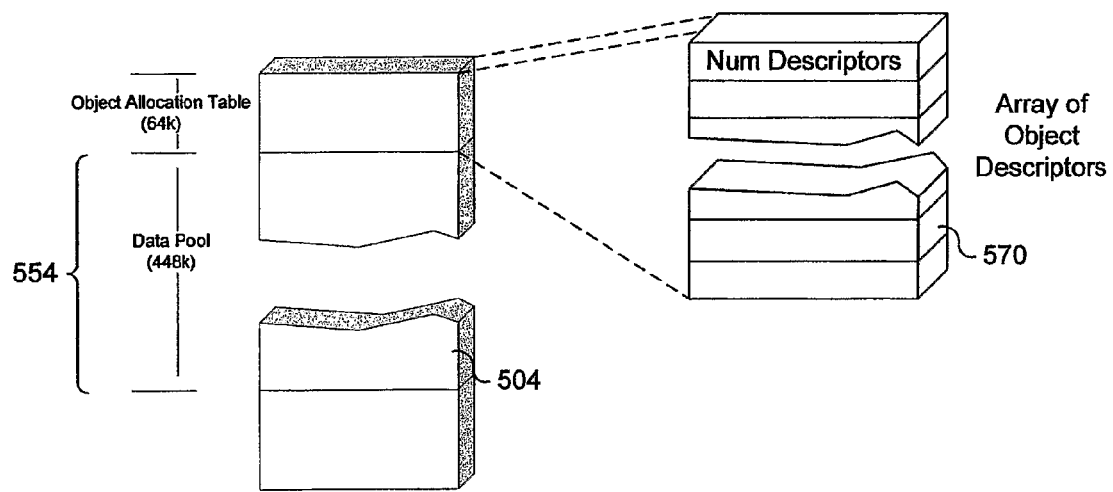

FIG. 5B provides further details on a memory organization for a persistent RAM according to alternative embodiments of the invention. In these embodiments, the NVRAM is treated as an array of data blocks. The data blocks are arranged into a single memory pool 504. All of the data blocks are of the same size. Each block may have an independent transaction state and CRC.

The block structure of some embodiments described above with reference to FIG. 5A provided a block descriptor for each data block. The structure illustrated in FIG. 5B describes alternative embodiments that replace the individual block descriptors with object descriptors 570. An object descriptor provides information for a group of contiguous data blocks that are grouped together to act as a larger block. In some embodiments, an object descriptor contains one or more of the following information:

A handle or identifier assigned by the CPU
Transaction ID
CRC for the memory bank
An index or address of the first data block in this object
The number of contiguous data blocks assigned referenced by the address.

In view of the fact that many data objects may contain more than one data block some embodiments do not reserve an object descriptor for each data block. For example, some embodiments assume that 4095 object descriptors are sufficient to map 7168 data blocks (i.e. each object contains 1.75 data blocks, on average).

Figure 5C:
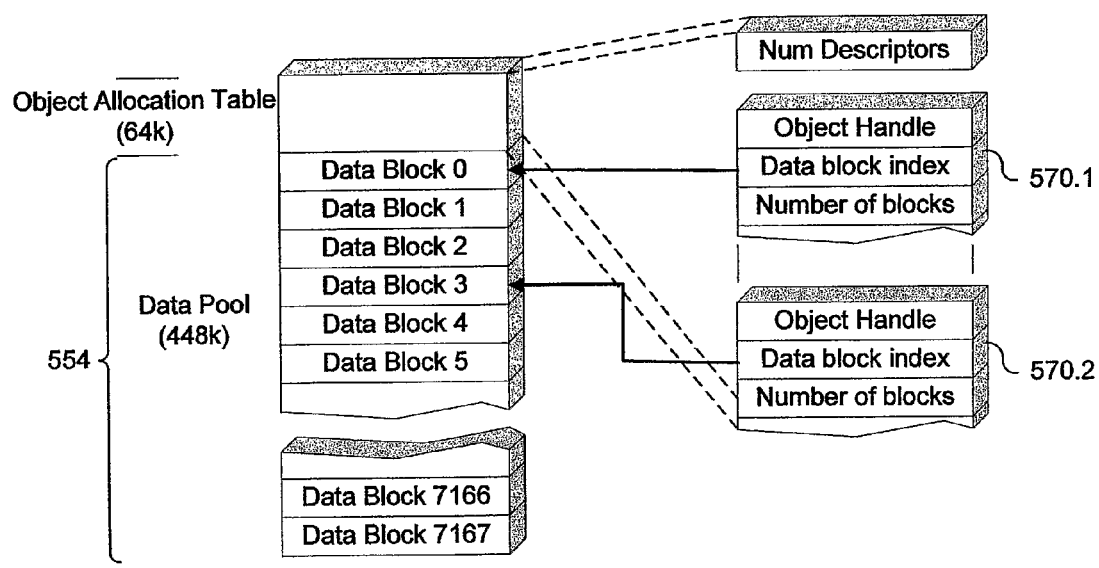

FIG. 5C illustrates how each object descriptor may map to multiple data blocks according to various embodiments of the invention. In the example illustrated in FIG. 5C, the first object descriptor maps to data block 0 and contains three consecutive blocks. Thus, in the example illustrated the second object starts at data block 3.

The example illustrated in FIG. 5C assumes that there are 512 k bytes of secure memory, which is divided into a 64 k object allocation table and a data pool of 448 k. This example assumes that the object allocation table contains 4095 object descriptors of approximately 16 bytes each. The data pool comprises 7168 data blocks of 64 bytes each. Those of ordinary skill in the art will appreciate that other sizes are possible and within the scope of the invention.

Figure 6:
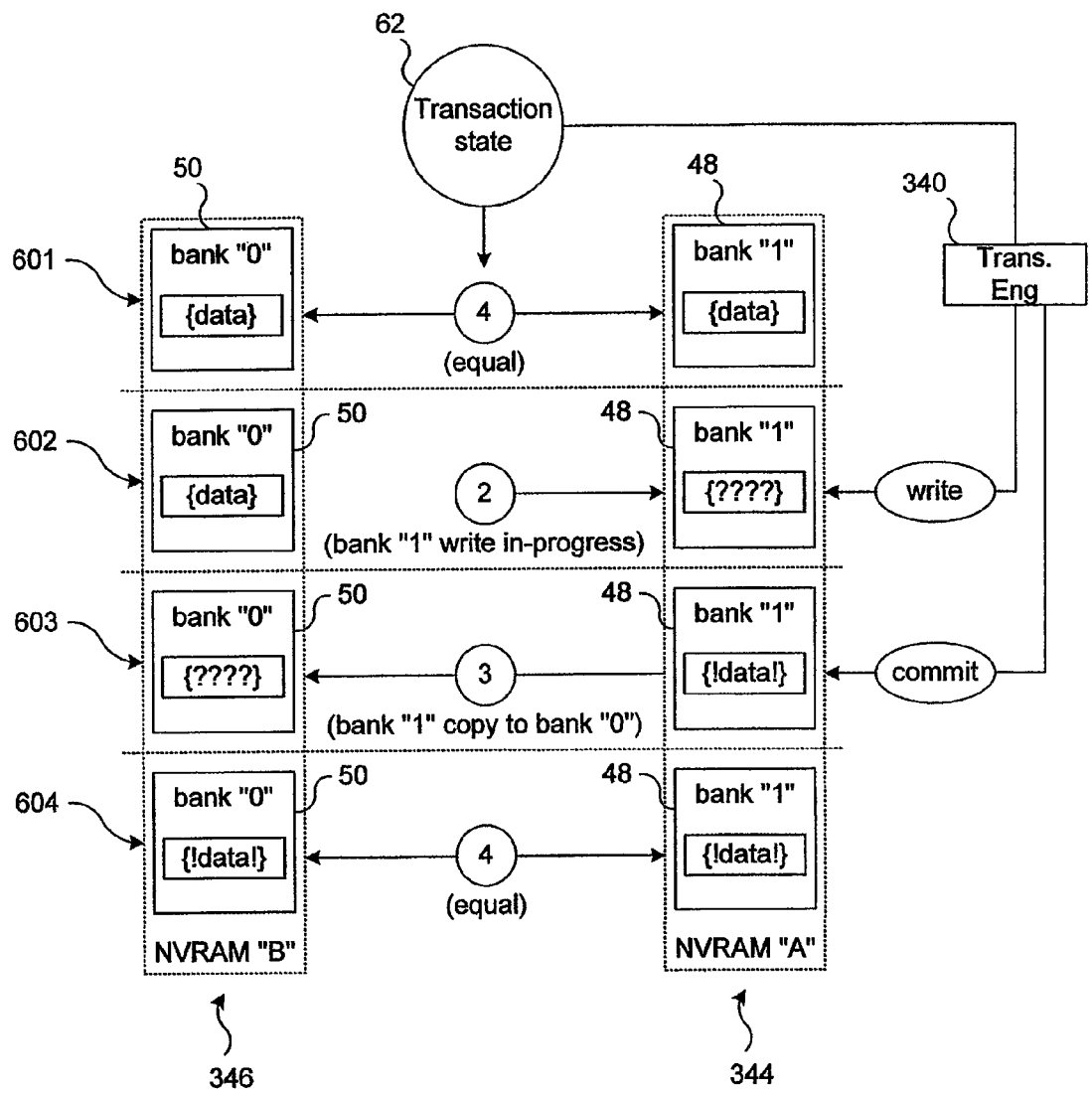
FIG. 6 is a visual representation of various memory states during a commit process and various methods of correction.

FIG. 6 is a data flow diagram showing exemplary transaction states 62 set during writing and committing data to a first NVRAM 344 then backup or mirroring of the data to a second NVRAM 346. This example flow shows occurrences during normal, eventless operation. A transaction state 62 is used to track state and/or progress of the transaction. A state indicator such as a variable, bit field, or other data structure may be used to maintain the transaction state. The first transaction state 62, number 4, shown in step 601 identifies the contents of both banks within NVRAM "A" 344 and NVRAM "B" 346 as equal and accurate. As will be understood by those with ordinary skill in the art, this state equates to a "clean", unmodified memory environment such as when a machine is started and has completed it's startup sequence. Transaction state 62 numbers 4 is a verification stage whereby the data contents of both memory banks have been compared to ensure they are equal in value.

Step 602 shows the transaction state 62 number 2 initiated as a write starts. In this embodiment, writes occur to bank "1" 48 on NVRAM "A" 344. As the write commences, bank "1" 348 becomes "dirty" meaning the memory is in use and the data residing on it is in the process of changing.

In step 603 a commit command is issued through the PRAM controller 332 defining the moment the write is completed. The data is checked for errors by one of many error-checking techniques that exist today. The error checking technique used is dependent on the type of data, the thoroughness required, and other factors. For example, checking CRC values or direct comparison of the data may be used.

Following the commit command, the transaction state 62 changes to 3 and a backup or mirror ensues of the new data in bank "1" 48. The new data in bank 1 48 is copied into bank "0" 50. When the transaction state 62 is 3, bank "1" 48 is locked and no new data may be written during the copy process. Once the copy process is completed, the transaction state 62 moves from 3 to 4 and both banks are once again equal. It should be noted that while FIG. 5 provides values of 2-4 for the various states, those of skill in the art will appreciate that any mechanism capable of representing various states may be used, and no embodiment of the invention is limited to those discussed above with respect to FIG. 6.

A valid recovery sequence can also be shown using FIG. 6. If, for example, power is lost during a write process but prior to commit (transaction state 62 number 2), after power is restored, the system verifies NVRAM validity. Data in bank "0" 50 is considered valid, data in bank "1" 48 is considered invalid, and the data in bank "0" 50 is copied to bank "1" 48. Similarly, if power is lost during a commit process (transaction state 62 number 3), after power is restored, the system verifies NVRAM validity. In this state, data in bank "1" 50 is considered valid, data in bank "0" 48 is considered invalid, and the data in bank "1" 50 is copied to bank "0" 48.

Figure 7:
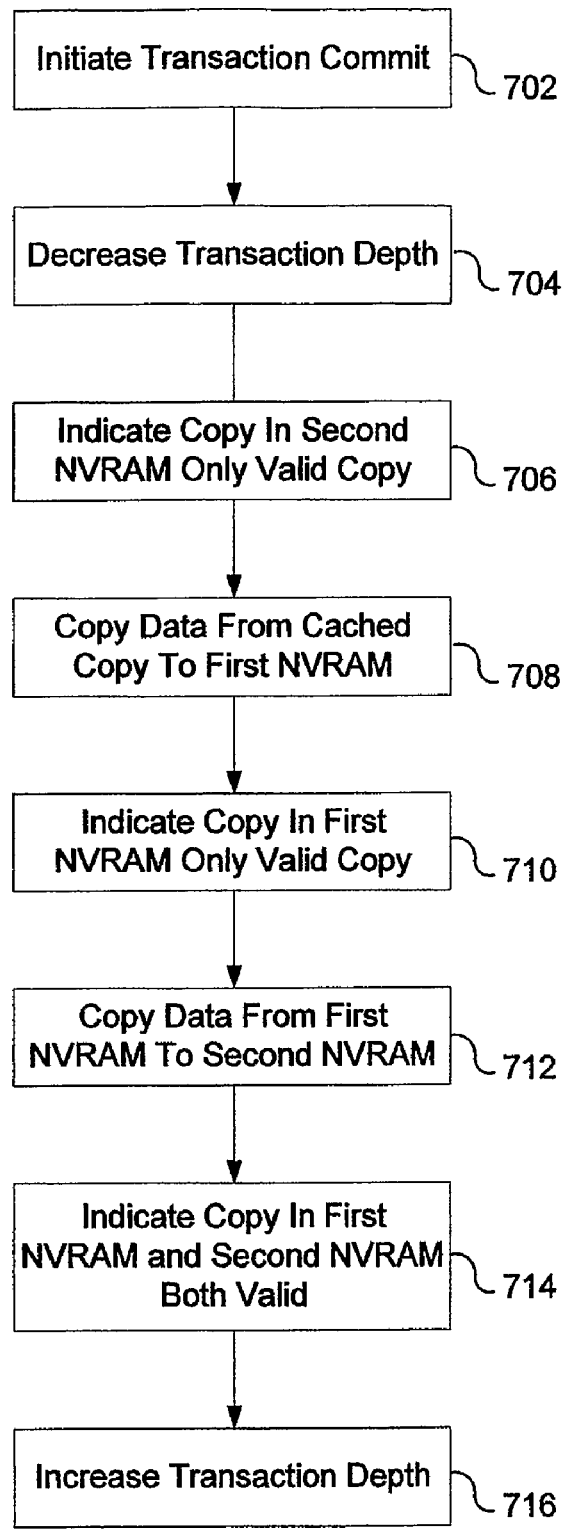
FIG. 7 is a flowchart illustrating a method for committing a transaction for critical data according to various embodiments of the invention.
Figure 8:
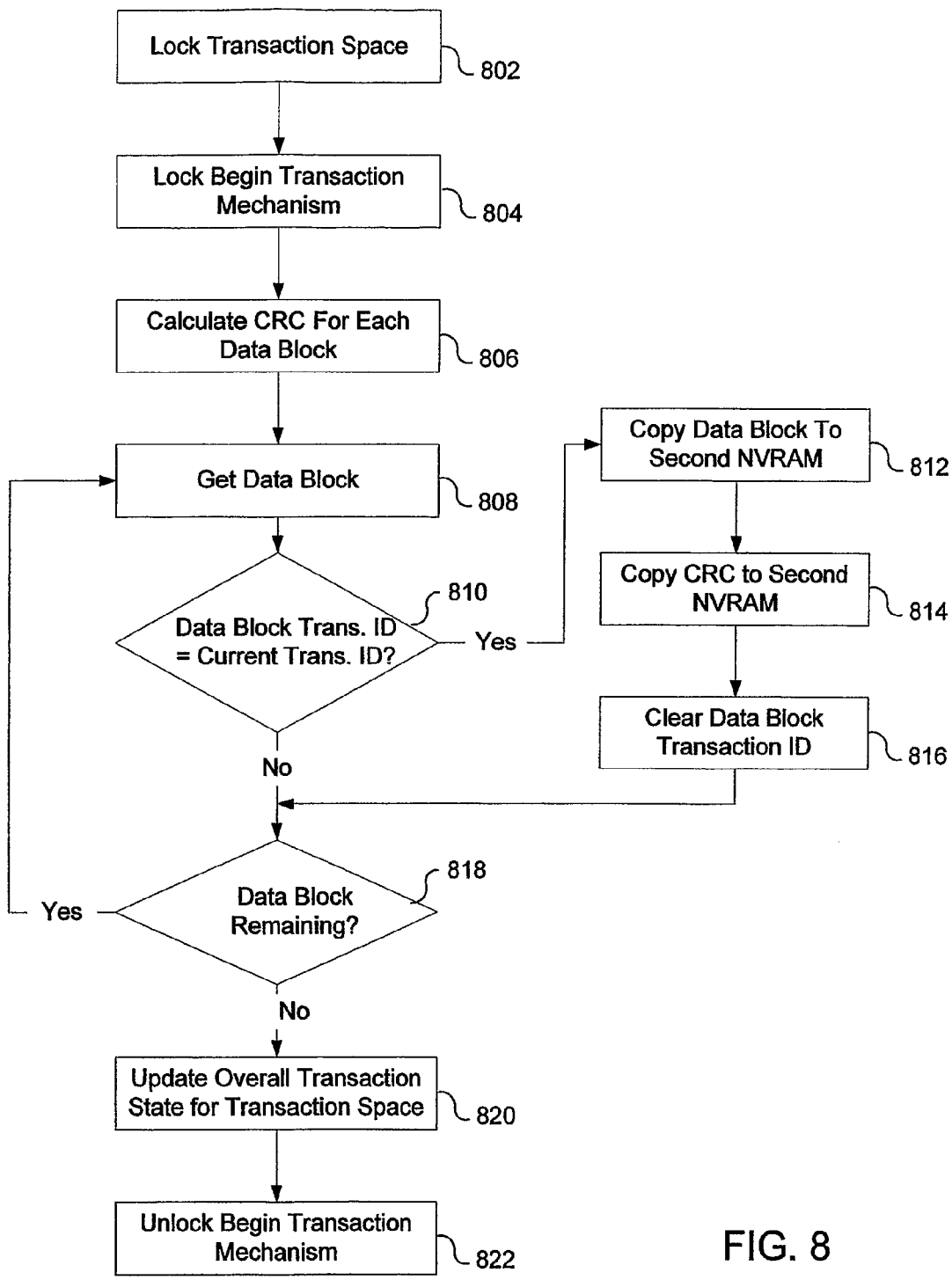
FIG. 8 is a flowchart illustrating a method for committing a transaction for critical data according to alternative embodiments of the invention.

FIGS. 7 and 8 are flowcharts illustrating methods for maintaining a secure fault tolerant PRAM according to embodiments of the invention. The methods to be performed by the operating environment executing on a gaming machine and may constitute at least in part computer programs made up of computer-executable instructions. Describing the methods by reference to a flowchart enables one skilled in the art to develop such programs including such instructions to carry out the methods on suitable computers (the processor or processors of the computer executing the instructions from computer-readable media such as RAM, ROM, CD-ROM, DVD-ROM, hard drives, flash memory etc.). The methods illustrated in FIGS. 7-8 are inclusive of acts that may be taken by an operating environment executing an exemplary embodiment of the invention. For example, the methods described below may be executed in whole or in part by a processor 20 on the gaming machine, the PRAM controller 332, or a combination of the two.

FIG. 7 illustrates a method for committing a transaction according to embodiments of the invention. In some embodiments, a transaction level may be used to determine when transaction-enabled objects are written. When it is greater than 0, then all updates to PRAM objects become "deferred". In embodiments utilizing an SDRAM cache, modifications to a data object are made to the SDRAM cache copy 402 while the transaction state is greater than 0. When all desired modifications are made, the client may cause the transaction engine 302 to commit the transaction (block 702). The commit may be initiated and executed by software running on a processor 20, or it may be initiated by processor 20 sending a commit signal to PRAM controller 332.

Next, the transaction level will be lowered by one (1). Maintaining a transaction level allows transactions to be 'nested' without having them overwrite or interfere with one another. Transaction-enabled objects in SDRAM memory 328 that were modified at the current transaction level are then committed to the fault tolerant memories 344 and 346 as described with respect to blocks 706-716. Note that in some embodiments, if the transaction level ever goes above one (1), then transactions 'nest'. The actual commitment of the transactions occurs when the last level of transaction is committed.

After determining that a transaction is to be committed, the transaction state indicator is changed indicating that the second NVRAM contains the only valid copy of a variable or data set (block 706).

Next, the data is propagated from the SDRAM cache memory to a first NVRAM memory (block 708). Upon completion of this step, the transaction state indicator is changed to indicate that the first NVRAM memory is valid and the second NVRAM is not (block 710). The data is propagated across from the first NVRAM memory to the second NVRAM memory (block 712). The transaction state indicator is modified to indicate that both NVRAM memories are valid.

At this point, the transaction may be considered complete, and the transaction depth is increased (block 716).

It should be noted that in some embodiments, the source of the transaction is a part of the transaction in addition to the critical data. For example, if the transaction is initiated from a queue, then the queue itself is a transaction-enabled variable. This is desirable because it ensures that the queue entry which causes the transaction will be left in the queue until the transaction is totally complete, and will not be removed or otherwise modified.

FIG. 8 illustrates a method for committing transactions on a gaming machine according to alternative embodiments of the invention. As noted above, in some embodiments, PRAM controller 332 maintains a variable or register that corresponds to the overall transaction depth for each transaction space. These registers may be used to determine when a transaction is actually complete and when the affected data blocks may be written. At power-up, the transaction depth is typically reset to zero, which corresponds to a "locked" state.

When the transaction depth is greater than 0, the PRAM controller 332 "unlocks" the associated transaction space, and data may be written to the persistent RAM. All writes to locations within the transaction space are written to a second NVRAM memory. The Transaction ID field is marked with the ID of the transaction space. The overall transaction state of the secure memory system is updated to two (2) in some embodiments. Calculation of data block error checking and updates to the first NVRAM memory may be deferred until the "commit" operation is performed.

When the processor 20 invokes the "commit" mechanism, the PRAM controller 332 decrements the transaction depth. When the transaction depth transitions from 1 to 0, the PRAM controller performs the "commit" operation. In other words, transaction "begin" and "commit" commands 'nest' and the actual commitment of a transaction set only occurs when the last level of the transaction has been committed.

The commit method begins by locking the transaction space (block 802). In some embodiments, any attempts to write to a locked transaction space causes an interrupt to be issued to the processor 20. Note that the transaction state of the system has been set to 2 prior to initiation of the commit operation in some embodiments.

Next, the begin transaction mechanism is locked so that no new transactions may be initiated while the commit operation is in progress. In some embodiments, the PRAM controller locks the begin transaction mechanism.

The transaction engine then traverses the block descriptor array. For each data block marked with a transaction ID equal to the current transaction ID the transaction engine calculates a new CRC (block 806). In some embodiments, after the array has been traversed the transaction engine updates the overall transaction state of the current transaction space to three (3).

The transaction engine then again traverses the block descriptor array, getting the next available block (block 806). The transaction engine checks to see if the transaction ID of the block matches the current transaction ID (check block 810).

If the block transaction ID matches the current transaction ID, then the transaction engine performs several operations on the data block. First, the transaction engine copies the contents of the data block in the second NVRAM to the corresponding data block in the first NVRAM (block 812). The transaction engine then copies the CRC from the data block in the second NVRAM to corresponding data block in the first NVRAM (block 814). Additionally, the transaction engine clears the data block transaction ID field (block 816).

If the data block transaction ID does not match the current transaction ID, then the system checks to see if any data block remain to be processed (check block 818). If so, the system proceeds to block 808 to obtain the next data block. Otherwise, the system proceeds to update the overall transaction state of the current transaction space to indicate the transaction writes have been completed (block 820).

The transaction engine then unlocks the begin transaction mechanism and unlocks the transaction space (block 822).

It should be noted that certain actions in the method described above may be performed in alternative orders;

order is only significant when the results of one action depend on the results of a previous action.

Further, it should be noted that as described above, data objects may be used to describe the critical data, and such data object may contain multiple data blocks. In these embodiments, the data object transaction ID are used instead of data block transaction IDs, and all of the data blocks for a data object are copied from the second NVRAM to the first NVRAM. Additionally, CRC values may be calculated over a complete data object including all of its data blocks rather than on individual data blocks.

Systems and methods for providing a secure fault tolerant memory system for a gaming machine have been disclosed. The systems and methods described provide advantages over previous systems.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

What is claimed is:

1. A gaming machine comprising:
   a processor;
   a system memory communicably coupled to the processor;
   a persistent memory controller;
   a persistent memory coupled to the persistent memory controller, the persistent memory comprising a first nonvolatile memory and a second nonvolatile memory; and
   a transaction engine operable to:
      manage a plurality of blocks in the first nonvolatile memory and the second nonvolatile memory, each of the blocks having a transaction state indicator, the transaction state indicator having a value, wherein the value indicates that the block in the first nonvolatile memory is valid, the block in the second nonvolatile memory is valid, or that the block in both the first nonvolatile memory and the second nonvolatile memory is valid,
      write data for a transaction to the persistent memory, the data occupying one or more of the plurality of blocks in one of the first nonvolatile memory and the second nonvolatile memory,
      copy the data between the first nonvolatile memory and the second nonvolatile memory, and
      update the value of the transaction state indicator for the one or more of the plurality of blocks.

2. The gaming machine of claim 1, wherein the first nonvolatile memory and the second nonvolatile memory comprise nonvolatile RAM (random access memory).

3. The gaming machine of claim 2, wherein the nonvolatile RAM comprises a battery backup RAM.

4. The gaming machine of claim 2, wherein the nonvolatile RAM comprises MRAM (magnetoresistive RAM).

5. The gaming machine of claim 2, wherein the nonvolatile RAM comprise FRAM (ferromagnetic RAM).

6. The gaming machine of claim 1, wherein the transaction engine is executed by the processor.

7. The gaming machine of claim 1, wherein the transaction engine is executed by the memory controller.

8. The gaming machine of claim 1, wherein the memory controller comprises an ASIC (Application Specific Integrated Circuit).

9. The gaming machine of claim 1, wherein the memory controller includes at least one processor.

10. The gaming machine of claim 1, wherein the memory controller comprises programmable logic.

11. The gaming machine of claim 1, wherein the first nonvolatile memory is mapped to be accessible to the processor and the second nonvolatile memory is not mapped to be accessible to the processor.

12. The gaming machine of claim 1, further comprising a plurality of transaction spaces allocated within the first nonvolatile memory.

13. A method for maintaining fault-tolerant memory in a gaming machine, the method comprising:
   initializing a plurality of blocks in a first nonvolatile memory and a second nonvolatile memory, each of the blocks having a transaction state indicator, the transaction state indicator having a value, wherein the value indicates that the block in the first nonvolatile memory is valid, the block in the second nonvolatile memory is valid, or that the block in both the first nonvolatile memory and the second nonvolatile memory is valid;
   initiating a transaction, said transaction including critical data;
   upon committing the transaction, writing the critical data to the first nonvolatile memory, the data occupying one or more of the plurality of blocks in one of the first nonvolatile memory and the second nonvolatile memory;
   copying the critical data between the first nonvolatile memory and the second nonvolatile memory; and
   updating the value of the transaction state indicator for the one or more of the plurality of blocks.

14. The method of claim 13, further comprising copying the critical data from a cache to the first nonvolatile memory.

15. The method of claim 13, further comprising:
   setting the transaction state indicator to indicate that the critical data in the second nonvolatile memory is valid prior to writing the critical data to the first nonvolatile memory; and
   setting the transaction state indicator to indicate that the critical data in the first nonvolatile memory is valid after writing the critical data to the first nonvolatile memory.

16. The method of claim 15, further comprising setting the transaction state indicator to indicate that the critical data in the first nonvolatile memory and the second nonvolatile memory are both valid.

17. The method of claim 13, further comprising:
   setting a transaction depth indicator to indicate the beginning of the transaction upon initiating the transaction; and
   setting the transaction depth indicator to indicate the completion of the transaction upon committing the transaction.

18. The method of claim 13, further comprising:
   mapping a plurality of transaction spaces to the first nonvolatile memory, each of the transaction spaces having a transaction depth indicator;
   setting the transaction depth indicator for a transaction space to indicate the beginning of the transaction using the transaction space upon initiating the transaction; and
   setting the transaction depth indicator for the transaction space to indicate the completion of the transaction for the transaction space upon committing the transaction.

19. A computer-readable medium having stored thereon computer executable instructions for causing one or more processors to perform a method for maintaining fault-tolerant memory in a gaming machine, the method comprising:

initializing a plurality of blocks in a first nonvolatile memory and a second nonvolatile memory, each of the blocks having a transaction state indicator, the transaction state indicator having a value, wherein the value indicates that the block in the first nonvolatile memory is valid, the block in the second nonvolatile memory is valid, or that the block in both the first nonvolatile memory and the second nonvolatile memory is valid;

initiating a transaction, said transaction including critical data;

upon committing the transaction, writing the critical data to a first nonvolatile memory, the data occupying one or more of the plurality of blocks in one of the first nonvolatile memory and the second nonvolatile memory;

copying the critical data between the first nonvolatile memory and the second nonvolatile memory; and updating the value of the transaction state indicator for the one or more of the plurality of blocks.

20. The computer-readable medium of claim 19, wherein the method further comprises copying the critical data from a cache to the first nonvolatile memory.

21. The computer-readable medium of claim 19, wherein the method further comprises:

setting the transaction state indicator to indicate that the critical data in the second nonvolatile memory is valid prior to writing the critical data to the first nonvolatile memory; and setting the transaction state indicator to indicate that the critical data in the first nonvolatile memory is valid after writing the critical data to the first nonvolatile memory.

22. The computer-readable medium of claim 21, wherein the method further comprises setting the transaction state indicator to indicate that the critical data in the first nonvolatile memory and the second nonvolatile memory are both valid.

23. The computer-readable medium of claim 19, wherein the method further comprises:

setting a transaction depth indicator to indicate the beginning of the transaction upon initiating the transaction; and setting the transaction depth indicator to indicate the completion of the transaction upon committing the transaction.

24. The computer-readable medium of claim 19, wherein the method further comprises:

mapping a plurality of transaction spaces to the first nonvolatile memory, each of the transaction spaces having a transaction depth indicator;

setting the transaction depth indicator for a transaction space to indicate the beginning of the transaction using the transaction space upon initiating the transaction; and setting the transaction depth indicator for the transaction space to indicate the completion of the transaction for the transaction space upon committing the transaction.

* * * * *

UNITED STATES PATENT AND TRADEMARK OFFICE
CERTIFICATE OF CORRECTION

PATENT NO. : 7,610,462 B2  Page 1 of 1
APPLICATION NO. : 11/575358
DATED : October 27, 2009
INVENTOR(S) : Mark B. Gagner et al.

It is certified that error appears in the above-identified patent and that said Letters Patent is hereby corrected as shown below:

In column 8, line 38, delete "348" and insert -- 48 --, therefor.

In column 8, line 49, delete "bank 1" and insert -- bank "1" --, therefor.

Signed and Sealed this

Nineteenth Day of January, 2010

David J. Kappos
*Director of the United States Patent and Trademark Office*